April 23, 1957  J. R. ZUMWALT  2,789,832
COMBINED MOTORCYCLE TOW BAR COUPLING AND FRONT WHEEL LIFT
Filed July 8, 1955
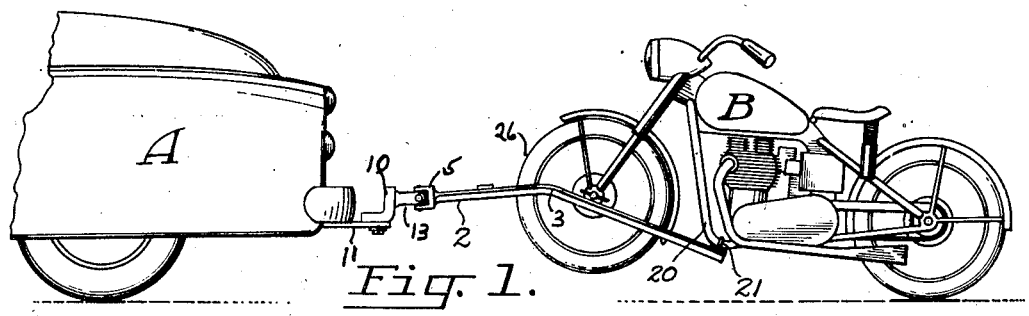
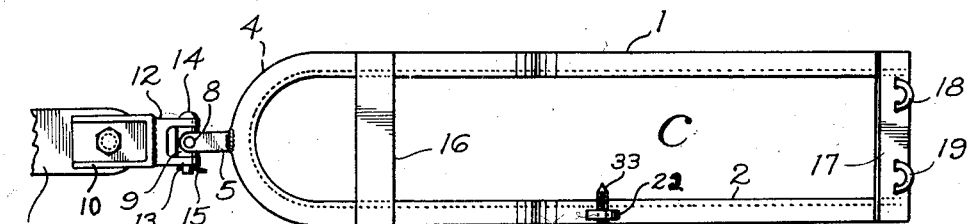
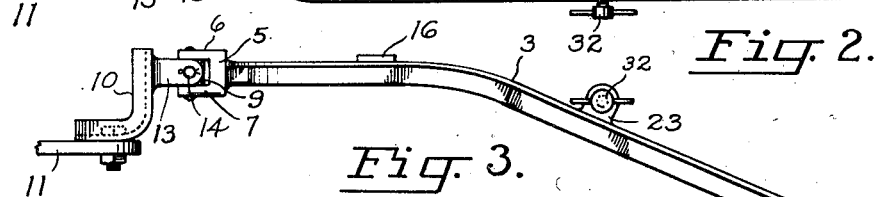
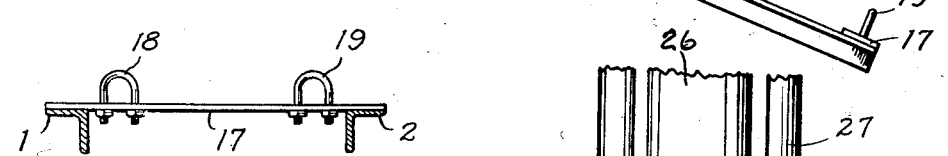
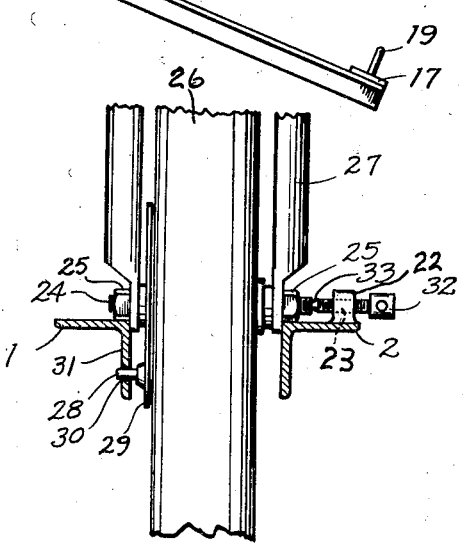
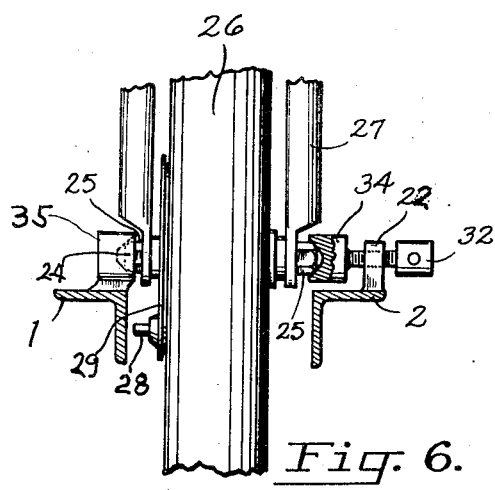
INVENTOR.
Jimmy R. Zumwalt
BY Samuel Jacobson
Atty.

United States Patent Office
2,789,832
Patented Apr. 23, 1957

2,789,832

COMBINED MOTORCYCLE TOW BAR COUPLING AND FRONT WHEEL LIFT

Jimmy R. Zumwalt, Canyonville, Oreg.

Application July 8, 1955, Serial No. 520,707

2 Claims. (Cl. 280—292)

My investigation of existing motorcycle tow bars and couplings and actual use of a number of them has revealed a number of weaknesses and limitations. The most undesirable of these is the fact that the existing tow bars and couplings do not provide for retaining the cycle in a completely upright position at all times during towing and neither is provision made in the coupling for vertical and lateral movement of the motorcycle in relation to the tractor vehicle and variations in the road contours. Thus a motorcycle in tow by a vehicle employing any of the existing tow bars and couplings receives unnecessary abuse and, at times, the steering mechanism of the cycle is damaged.

The quintessence of my invention is to provide a tow bar and coupling which eliminates many of the disadvantages of existing motorcycle tow bars and couplings and particularly assures a positive, yet variable, connection between the tractor vehicle and motorcycle being towed without the use of the front wheel or its steering mechanism during the towing operation.

My invention relates specifically to a motorcycle tow bar and coupling which has the advantage of towing a motorcycle with the front wheel of the cycle raised from the ground, retained at all times in an upright position, and secured against movement during towage of the cycle.

The principal object of my invention, therefore, is to provide a universal coupling securable to a standard vehicle tow-hitch which allows vertical and lateral movement of the motorcycle being towed, relative to the towing vehicle, without the use of the front wheel assembly of the cycle.

Still another object of my invention is to provide a tow bar assembly which, when secured to the cycle frame and the front wheel axle of a motorcycle, not only retains said front wheel above the ground but secures the front wheel assembly against any movement whatever while the cycle is being towed and provides a rigid longitudinal support thereto.

A still further object of my invention is to provide a combined motorcycle tow bar assembly and coupling which retains the motorcycle being towed in rigid relation to the tow bar and to the towing vehicle and allows only the play provided for in the coupling to give direction to the rear or traction wheel of the motorcycle.

Still another object of my invention is to eliminate the need of maintaining the front wheel assembly of the cycle in tractile relation with the towing vehicle and employing the coupling between the two for that purpose.

Another object of the invention is to provide a structurally sound tow bar assembly easily adaptable for towing of practically all types of motorcycles employing the rear wheel to provide tractability thereto and assure stability to the front wheel assembly during the towing operation.

Other objects and advantages and the novel features of my invention and its characteristics will be more readily understood from the detailed description which follows, taken in connection with the accompanying drawings forming part thereof, and in which:

Figure 1 is a side elevational view of a motorcycle to which a tow bar and front wheel lift embodying my invention is connected and which is in coupled relation to the rear of a vehicle by a coupling device of my invention;

Figure 2 is a top plan view of the tow bar frame and coupling embodying my invention;

Figure 3 is a side view of the tow bar frame and coupling of my invention;

Figure 4 is an end elevation of the tow bar frame;

Figure 5 is a fragmentary front view of a motorcycle, showing the tow bar frame in section and revealing the means for maintaining the front wheel assembly and tow bar frame in rigid relationship to each other; and Figure 6 is a similar view but showing somewhat modified means for securing the front wheel and tow bar frame against movement relative to each other.

Fancifully represented in Fig. 1 of the drawing is the rear portion of a tractor vehicle, designated generally by reference character A and a motorcycle, generally designated by reference character B. Except for the usual attachment of a standard tow hitch either to the rear bumper or to the under frame of the tractor vehicle, there are no structural modifications required to the motor vehicle or motorcycle, when my combined tow bar coupling and front wheel lift is employed therebetween. Their representation in the drawing is entirely for the purpose of facilitating the description of the tow bar and front wheel lift embodying my invention and to illustrate its efficacy in use.

The structural details of the invention, revealed in the accompanying drawing, which by reference thereto is made a part of this specification, consists of a stationary supporting frame, designated generally by reference character C, having a pair of elongated L-shaped members 1 and 2 disposed in spaced relationship to each other in the same plane but identically angled, as shown at 3 in Figs. 1 and 3. Members 1 and 2 are an integral part of and terminate in a bow or yoke 4. At the apex of bow 4, a bifurcated tongue 5 is secured or made an integral part thereof. Tongue 5 has openings vertically aligned in lugs 6 and 7 which form the bifurcation of tongue 5. A hinge pin or pivot 8 is insertable in said openings and holds, in pivotal relation to and between the lugs 6 and 7, a universal block 9, having a pair of openings passing therethrough which are disposed at right angles to each other—one being vertically positioned and the other horizontally positioned. Pin 8 passes through the vertically positioned opening in block 9 and is secured against displacement in any desirable manner.

A tow hitch member 10 is securable to the rear position of the tractor vehicle A in any desirable manner. In the illustration, member 10 is removably secured to a rearwardly extending arm 11 attached, in any well-known manner, to the frame of the tractor vehicle. Obviously the tow hitch member could be clamped or otherwise secured to the rear bumper of the tractor vehicle, if desired. Tow hitch member 10 has a pair of parallelly disposed lugs 12 and 13 extending rearwardly therefrom between which universal block 9 is positioned so that the horizontally disposed opening in the block coincides with a pair of aligned openings in lugs 12 and 13. A pivot pin 14 passes through these openings and is secured in position in any well-known manner, as by cotter key 15.

Transversely positioned reinforcing plates 16 and 17 are rigidly secured to and disposed between members 1 and 2 of frame C, one being disposed at the juncture of these members with bow 4 and the other plate being disposed across the ends of members 1 and 2. Suitable fastenings, such as a pair of threaded U-shaped clamps 18 and 19 are movably disposed therethrough in spaced relation to each other and are adapted to fit over and be secured to the lower tubular frame 20 of motorcycle B, as shown at 21.

Suitable means are provided upon and associated with members 1 and 2 of the frame C to rigidly retain the front wheel assembly of the cycle in a raised and upright position while being towed, as shown in Fig. 1. This is accomplished by providing an ear 22 extending upwardly from member 2 and positioned relative thereto so as to have its threaded opening 23 in alignment with the axle 24, when the cycle is raised into the position shown in Fig. 1.

Referring to Fig. 5, it will be observed that nuts 25, threaded on axle 24 of the cycle are seated upon members 1 and 2 of frame C. Front wheel 26, rotatably positioned on the axle, is disposed between the tynes of steering fork 27, and both are confined on the axle 24 which extends beyond the fork 27 to receive the locking nuts 25. A stub 28 extends from brake plate 29 and fits into a slot 30 provided in the depending wall 31 of member 1. Key 32, threadably disposed in ear 22, is moved laterally relative thereto to permit intimate engagement of its end 33 with shaft 24, when the tow bar frame is secured to the cycle and the front thereof is raised as shown in Fig. 1. In this manner the steering fork 27 is secured against any movement and, for all purposes, is immobilized during the time the cycle is in tow.

The same results may be accomplished by the use of the modified structure shown in Fig. 6. Key 32 is modified to the extent of having a head 34 rotatably positioned at its end and the head has a recess therein, the diameter of which is slightly greater than the overall diameter of nut 25, so that when key 32 is turned toward the axle 24 the nut 25 will be received in the recess in head 34. Another head 35, substantially identical in structure to head 34, is positioned upon member 1 in apposite relation to head 34 and is adapted to receive the other nut 25, when the cycle is raised into the position shown in Fig. 1.

Either of these arrangements in structure has a direct stabilizing effect upon the motorcycle and maintains the front end thereof in an upright position regardless of the movement of the tractor vehicle. Lateral and vertical movement of the tractor vehicle is translated to the towed cycle by the articulated coupling previously described but these movements do not in any way affect the upright position of the front of the cycle, but merely serve to compensate for turning movements and variations in road contours.

It should also be pointed out that the coupling embodying my invention can be applied to practically any present type of tow hitch and is so constructed as to resist any catapulting action caused by forward thrust occasioned by a sudden slackening of speed or by a hurried forward movement.

Although I have found in actual practice that the device as shown and described is efficient and satisfactory in operation, it is obvious that various changes may be made in the details of construction and arrangement of parts which will come within the scope of this invention, and, therefore, I do not wish to limit myself to the exact construction and arrangement herein shown, except as specified in the following claims, in which I claim:

1. A combined motorcycle tow bar and front wheel lift for connecting a motorcycle to a towing vehicle comprising, in combination, a supporting frame, means for securing said supporting frame to the lower portion of the motorcycle frame, comprising a pair of inverted U-shaped clamps loosely positioned in spaced relation to and at the rear of said supporting frame and adapted to fit over and be removably clamped about the lower portion of the motorcycle frame, means disposed approximately centrally and on one side of the supporting frame for rigidly securing the front wheel steering fork assembly against lateral movement and for retaining said assembly in an upright position at all times while simultaneously elevating said assembly above the road surface, comprising an ear, having a threaded opening therein, extending upwardly from the supporting frame positioned in direct alignment with the axle supporting the front wheel of the motorcycle, a key threadably disposed in the opening of said ear, the pointed end of which being adapted to engage the end of the axle upon rotation of said key towards the axle, a slot formed at the opposite side of the supporting frame, and a stub extending from the front wheel motorcycle brake plate adapted for insertion in said slot, and means extending from the front end of the supporting frame arranged to permit engagement with the towing vehicle.

2. A combined motorcycle tow bar and front wheel lift characterized as in claim 1 wherein the means for securing the front end of the supporting frame to the towing vehicle comprises, a bifurcated tongue extending from the front portion of said frame, said tongue having a pair of spaced and aligned openings therein, a bifurcated tow hitch member secured to the rear of the towing vehicle, said member having a pair of coinciding spaced openings therein, a universal block, movably fitted between said tongue and said tow hitch member and having a pair of openings therethrough disposed at right angles, one of them being vertically positioned and aligned to fit the openings in the bifurcated tongue and the other opening being horizontally positioned to coincide with the openings in the tow hitch member, and removable pins disposed through the respective openings in the block to form pivots so arranged as to permit vertical and lateral motion between the towing vehicle and the motorcycle without affecting the position of the front wheel steering fork assembly.

References Cited in the file of this patent

UNITED STATES PATENTS

| | | |
|---|---|---|
| 718,322 | Davis | Jan. 13, 1903 |
| 2,329,525 | Garrison | Sept. 14, 1943 |
| 2,489,771 | Gibson | Nov. 29, 1949 |
| 2,552,846 | Dinkins | May 15, 1951 |